(12) United States Patent
Nakamura et al.

(10) Patent No.: US 11,152,753 B2
(45) Date of Patent: Oct. 19, 2021

(54) CONDUCTOR CONNECTION DEVICE AND CONDUCTOR CONNECTION METHOD

(71) Applicants: FURUKAWA ELECTRIC CO., LTD., Tokyo (JP); FURUKAWA AUTOMOTIVE SYSTEMS INC., Inukami-gun (JP)

(72) Inventors: Toshihiro Nakamura, Tokyo (JP); Takashi Nakayama, Tokyo (JP); Tomohiro Nakayama, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 27 days.

(21) Appl. No.: 16/739,205

(22) Filed: Jan. 10, 2020

(65) Prior Publication Data

US 2020/0227877 A1    Jul. 16, 2020

Related U.S. Application Data

(63) Continuation of application No. PCT/JP2018/026516, filed on Jul. 13, 2018.

(30) Foreign Application Priority Data

Jul. 14, 2017 (JP) .............................. JP2017-138506

(51) Int. Cl.
*B23K 20/10* (2006.01)
*H01R 43/02* (2006.01)

(52) U.S. Cl.
CPC ......... *H01R 43/0207* (2013.01); *B23K 20/10* (2013.01); *B23K 20/106* (2013.01)

(58) Field of Classification Search
CPC ........ H01R 43/0207; B23K 20/10–106; B23K 20/233; B23K 20/2336; B23K 20/24;
(Continued)

(56) References Cited

U.S. PATENT DOCUMENTS

| 4,596,352 A | 6/1986 | Knapp | |
| 4,867,370 A * | 9/1989 | Welter | ...................... B06B 3/00 228/110.1 |

(Continued)

FOREIGN PATENT DOCUMENTS

| CN | 101772866 A | 7/2010 |
| CN | 103430398 A | 12/2013 |

(Continued)

OTHER PUBLICATIONS

Combined Chinese Office Action and Search Report dated Feb. 8, 2021 in Patent Application No. 201880046211.5 (with English machine translation), citing documents AO and AP therein, 16 pages.

(Continued)

*Primary Examiner* — Kiley S Stoner
(74) *Attorney, Agent, or Firm* — Oblon, McClelland, Maier & Neustadt, L.L.P.

(57) ABSTRACT

A conductor connection device for joining a plurality of conductors with ultrasonic welding, the conductor connection device comprising: a horn including a contact surface that is brought into contact with the conductors, the horn being configured to be ultrasonically vibrated; a pair of restricting portions configured to be brought into contact with the contact surface and to be relatively movable along the contact surface; and an anvil that is relatively moved toward and away from the contact surface, the horn and the pair of restricting portions being moved relative to the anvil to sandwich the anvil between the pair of restricting portions (Continued)

facing each other, and at least one of the pair of restricting portions being moved toward the other.

8 Claims, 8 Drawing Sheets

(58) Field of Classification Search
CPC ............ B23K 2103/10; B23K 2103/12; B23K 2101/32; B23K 2101/38; B23K 20/004; B23K 1/06; B29C 65/08–088
USPC ................. 228/1.1, 110.1, 4.5, 180.5, 904
See application file for complete search history.

(56) References Cited

U.S. PATENT DOCUMENTS

| | | | |
|---|---|---|---|
| 2010/0170935 A1 | 7/2010 | Stroh et al. | |
| 2013/0000949 A1* | 1/2013 | Torimoto | B23K 20/106 174/113 R |
| 2013/0293045 A1* | 11/2013 | Kajita | H02K 15/0068 310/71 |
| 2014/0014709 A1 | 1/2014 | Takayashiki | |
| 2014/0144016 A1* | 5/2014 | Bauer | B23K 26/21 29/863 |
| 2014/0311797 A1* | 10/2014 | Numata | H01R 43/0207 174/75 R |
| 2014/0311798 A1* | 10/2014 | Numata | H01R 4/187 174/75 R |
| 2017/0144246 A1* | 5/2017 | Bogen | B23K 20/26 |
| 2018/0272620 A1* | 9/2018 | Persson | B29C 66/4312 |
| 2018/0318897 A1* | 11/2018 | Satou | B21F 15/04 |
| 2019/0052040 A1* | 2/2019 | Suzuki | H01R 43/02 |
| 2019/0131753 A1* | 5/2019 | Idota | H01R 43/0263 |
| 2019/0165532 A1* | 5/2019 | Sato | H01R 4/023 |
| 2019/0165533 A1* | 5/2019 | Nabeta | H01R 43/28 |
| 2019/0173251 A1* | 6/2019 | Wagenbach | H01L 24/78 |
| 2019/0273354 A1* | 9/2019 | Sato | H01R 4/021 |
| 2019/0273355 A1* | 9/2019 | Sato | B23K 20/10 |
| 2020/0091670 A1* | 3/2020 | Sato | H01R 4/023 |
| 2020/0112134 A1* | 4/2020 | Schmidt | B23K 37/0443 |
| 2020/0169052 A1* | 5/2020 | Suzuki | H01R 43/0207 |
| 2021/0028562 A1* | 1/2021 | Nakamura | B23K 20/106 |

FOREIGN PATENT DOCUMENTS

| | | | |
|---|---|---|---|
| DE | 33 35 254 A1 | 4/1985 | |
| DE | 34 37 749 A1 | 4/1986 | |
| DE | 3437749 A1 * | 4/1986 | ......... H01R 43/0207 |
| DE | 44 29 684 A1 | 2/1996 | |
| DE | 10 2004 044 480 A1 | 2/2006 | |
| DE | 10 2007 027 208 A1 | 12/2008 | |
| DE | 102013107637 A1 * | 1/2015 | ............ B23K 20/10 |
| DE | 102016214227 B3 * | 12/2017 | ............ B23K 20/10 |
| JP | 41 -021167 | 10/1966 | |
| JP | 09-082375 A | 3/1997 | |
| JP | 09155979 A * | 6/1997 | ....... B29C 66/81431 |
| JP | 2010-218796 A | 9/2010 | |
| JP | 2012-192413 A | 10/2012 | |
| JP | 2015-167957 A | 9/2015 | |
| WO | WO-2005042202 A1 * | 5/2005 | ............ H01R 4/029 |
| WO | WO-2006005509 A1 * | 1/2006 | .......... B23K 20/004 |
| WO | WO-2014204741 A1 * | 12/2014 | ............ H01R 4/021 |

OTHER PUBLICATIONS

Office Action dated Aug. 21, 2020 in corresponding Japanese Patent Application No. 2017-138506 (with English Translation), citing documents AO-AQ therein, 8 pages.
German Office Action dated Nov. 4, 2020 in corresponding German Patent Application No. 11 2018 002 125.4 (with English Translation), citing documents AO-AR therein, 13 pages.
International Search Report dated Oct. 2, 2018 in PCT/JP2018/026516 filed on Jul. 13, 2018 (with English Translation), citing documents AA & AP-AQ therein, 4 pages.

* cited by examiner

CONDUCTOR CONNECTION DEVICE AND CONDUCTOR CONNECTION METHOD

TECHNICAL FIELD

The disclosure relates to a conductor connection device that electrically connects a conductor disposed on a vehicle or the like, for example, and a conductor connection method of the conductor.

BACKGROUND ART

In recent years, various electrical devices for improving operability and comfort are mounted in an automobile, and such electrical devices are electrically connected to each other by a wire harness or the like to transmit and receive a signal or supply electric power.

The wire harness described above is composed of a plurality of insulated wires that can be made conductive by exposing conductors covered with insulating covering and connecting them to each other. In the related art, a conductor connection device that electrically connects conductors to each other as described above has been proposed.

For example, Patent Document 1 discloses a conductor connection device in which a plurality of conductors are disposed in a conductor placement space formed by restricting portions disposed facing each other at a predetermined interval in a width direction and an anvil and a horn disposed facing each other between the pair of restricting portions, and the horn is moved toward the anvil to compress the conductors with ultrasonic vibration applied to the horn to enable the conductors to be joined to each other.

Unfortunately, the conductor connection device disclosed in Patent Document 1 has a problem that when conductors inserted in the conductor placement space are different in diameter or number, a wire harness produced using these conductors changes in an outside diameter to cause the conductors to be disabled in being inserted into the conductor placement space, or the conductors to be disabled in being reliably joined to each other due to a gap remaining in the conductor placement space.

When the number of the conductors or the like is changed as described above, there is a problem that the horn and the restricting portion and the anvil are all required to be replaced, and thus it takes time to change set-up. That is, the conductor connection device disclosed in Patent Document 1 has a problem that it cannot handle joining of various conductors.

CITATION LIST

Patent Document

Patent Document 1: JP H9-82375 A

SUMMARY

Technical Problem

In light of the problems described above, an object of the disclosure is to provide a conductor connection device and a conductor connection method that can easily handle joining of various conductors.

Solution to Problem

The disclosure relates to a conductor connection device for joining a plurality of conductors with ultrasonic welding, the conductor connection device including: a horn including a contact surface that is brought into contact with the conductors, the horn being configured to be ultrasonically vibrated; a pair of restricting portions configured to be brought into contact with the contact surface and to be relatively movable along the contact surface; and an anvil that is relatively moved toward and away from the contact surface, the horn and the pair of restricting portions being moved relative to the anvil to sandwich the anvil between the pair of restricting portions facing each other, and at least one of the pair of restricting portions being moved toward the other.

The disclosure also relates to a conductor connection method including the steps of: disposing a plurality of conductors in a space formed by a horn including a contact surface that is brought into contact with the conductors, the horn being configured to be ultrasonically vibrated, and a pair of restricting portions that is brought into contact with the contact surface and is disposed facing each other at a predetermined interval, the pair of restricting portions being relatively moved along the contact surface; moving the horn and the pair of restricting portions relative to an anvil disposed at a predetermined interval with respect to the contact surface while moving at least one of the pair of restricting portions relatively toward the other to sandwich the anvil between the pair of restricting portions facing each other, and compressing the conductors with the anvil and the horn with the pair of restricting portions sandwiching the anvil; and welding the conductors compressed by the anvil and the horn with ultrasonic welding by ultrasonically vibrating the horn.

The conductors include a stranded wire formed by twisting a wire having electrical conductivity, a conductor formed of a single wire, a conductor including a bundle of wires, and the like. The conductors may be made of any material having electrical conductivity, and include a copper conductor made of copper or a copper alloy, and an aluminum-based conductor made of aluminum, aluminum alloy, or the like.

The conductors includes, an exposed conductor with one end exposed by cutting off an insulating covering, forming an outer layer of an insulated wire formed by covering a strand or a bundle of wires with the insulating covering, for example, a stranded wire conductor covered with no insulating covering, a conductor of a bundle of wires, and the like. The conductors also include a conductor including a joining portion surrounded and joined with a copper tube, copper foil, or the like, for example.

The plurality of conductors described above may be composed of the same type or different types of conductor. Specifically, the conductors each may have a different outer diameter or material, and some of them may be stranded wires or single wires.

The disclosure enables joining of various conductors to be easily handled.

Specifically, the pair of restricting portions is configured to be movable along the contact surface of the horn, so that even when the conductors change in outside diameter or number, the conductors can be disposed in the conductor placement space formed by the contact surface and the pair of restricting portions by adjusting a position of the pair of restricting portions.

Accordingly, the conductors can be joined to each other only with the anvil replaced suitable for the conductors to be joined. Thus, taking time for changing set-up for welding the conductors with ultrasonic welding can be prevented, enabling the conductors to be easily joined.

Specifically, even when a wire harness composed of joined conductors is different in outside diameter from a wire harness produced by joining conductors previously, or different in number of conductors to be joined, for example, the restricting portion can be moved along the contact surface to form the conductor placement space suitable for inserting the conductors. Thus, the conductor placement space suitable for the conductors can be easily formed, so that the set-up change for joining the conductors can be easily performed.

The restricting portions are also configured to be movable along the contact surface of the horn, so that no gap is formed between the pair of restricting portions and the horn due to ultrasonic vibration of the horn. Thus, even when the horn is moved relative to the anvil to compress while being ultrasonically vibrated, the conductors can be prevented from being caught in a gap formed between the horn and the pair of restricting portions to form burrs.

In addition, the pair of restricting portions are configured to be relatively movable along the contact surface of the horn, so that a position of the contact surface being brought into contact with the conductors can be changed by appropriately changing positions of the respective restricting portions along the contact surface. That is, a position of wear due to the ultrasonic vibration of the horn can be changed, so that localized wear of the horn can be prevented to enable life of the device to be extended.

Movement of the horn and the pair of restricting portions relative to the anvil and movement of the pair of restricting portions include movement of the pair of restricting portions and movement of the horn or the like at the same timing, and movement of the pair of restricting portions disposed facing each other along the contact surface and movement of the horn and the pair of restricting portions relative to the anvil, being performed independently.

As an aspect of the disclosure, the horn may be ultrasonically vibrated in a direction intersecting a direction in which the pair of restricting portions faces each other and a direction in which the horn and the anvil face each other.

The above-described intersecting direction is not limited to an orthogonal direction orthogonal to the direction in which the pair of restricting portions faces each other (referred to as an opposing direction) and the direction in which the horn and the anvil face each other (referred to as a compression direction), and may be a direction intersecting the orthogonal direction.

The disclosure enables the conductors to be efficiently joined.

Specifically, the horn and the anvil compress the conductors disposed in the conductor placement space, so that an external force acts on the contact surfaces of the respective conductors aligned in the compression direction toward the compression direction. In addition, while the horn and the anvil compress the conductors to cause the conductors to tend to spread in the opposing direction, movement of the conductors in the opposing direction is restricted by the pair of restricting portions. Accordingly, an external force acts on the contact surfaces of the respective conductors aligned in the opposing direction toward the opposing direction.

In this state, for example, when the horn is ultrasonically vibrated in the compression direction and the direction orthogonal to the opposing direction, the conductors are ultrasonically vibrated in the compression direction and the direction orthogonal to the opposing direction in which an external force is acting on the conductors. Accordingly, an oxide film or the like on a metal surface of each of the conductors on which the external force acts are reliably removed, so that the conductors are easily welded due to interatomic attraction of metal constituting each of the conductors. As a result, the conductors aligned in the compression direction or the opposing direction can be efficiently and reliably joined.

As another aspect of the disclosure, a control unit may be provided that synchronizes movement of the horn and the pair of restricting portions relative to the anvil and movement of at least one of the pair of restricting portions relative to the other.

According to the disclosure, when the movement of the horn and the restricting portion in the compression direction and the movement of the pair of restricting portions in the opposing direction are synchronized, the anvil and the pair of restricting portions can be brought into contact with each other before the anvil and the horn compress the conductors, and thus the conductors can be reliably prevented from being caught in a gap formed between the anvil and the pair of restricting portions.

As yet another aspect of the disclosure, the horn and the pair of restricting portions may be moved toward the anvil.

According to the disclosure, it is not necessary to have a complex structure in which both the horn and the pair of restricting portions or the anvil are moved. Thus, a drive mechanism can be provided only for the horn, so that the conductors can be reliably connected with a simple structure.

As yet another aspect of the disclosure, the anvil may be formed with an opposing contact surface facing the contact surface, and having a rugged shape.

According to the disclosure, the conductors in contact with the opposing contact surface are disposed along the rugged shape, so that a contact surface on which the corresponding conductors are brought into contact with each other is likely to be formed at a position intersecting the compression direction or the opposing direction.

Accordingly, when the horn is ultrasonically vibrated, the contact surface is not perpendicular to the vibration direction, and thus an oxide film on the contact surface is likely to be more easily removed. Thus, ultrasonic welding can be performed efficiently, so that the conductors can be reliably joined to each other.

As yet another aspect of the disclosure, the rugged shape of the opposing contact surface may be formed in a direction intersecting a vibration direction of ultrasonic vibration of the horn.

According to the disclosure, a contact surface between the conductors and the vibration direction can be more reliably intersected with each other, so that an oxide film on the contact surface between the conductors can be more efficiently removed with ultrasonic vibration of the horn. Thus, the conductors can be more reliably joined to each other.

As yet another aspect of the disclosure, a plurality of the anvils may be provided in accordance with the conductors configured to be replaceable.

According to the disclosure, the anvil can be more easily replaced with a desired anvil, so that taking time for ultrasonic welding of the conductors can be more reliably prevented to enable improving versatility.

Advantageous Effects of Invention

The disclosure enables providing a conductor connection device and a conductor connection method capable of easily handling joining of various conductors.

DESCRIPTION OF EMBODIMENTS

In the following, one embodiment of the disclosure will be described together with the drawings.

Figure 1:
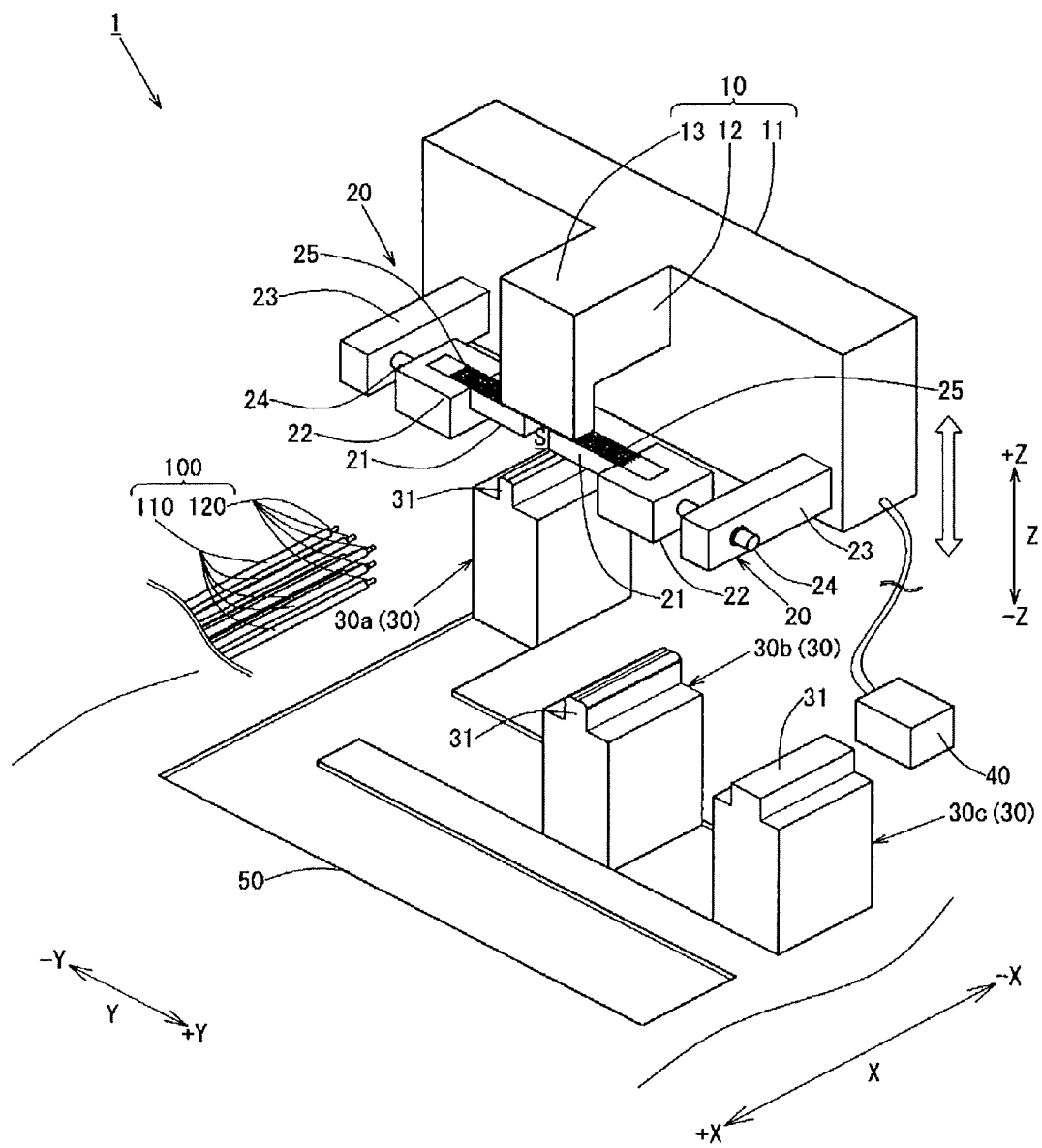
FIG. 1 is a schematic perspective view of a conductor connection device.
Figure 2:
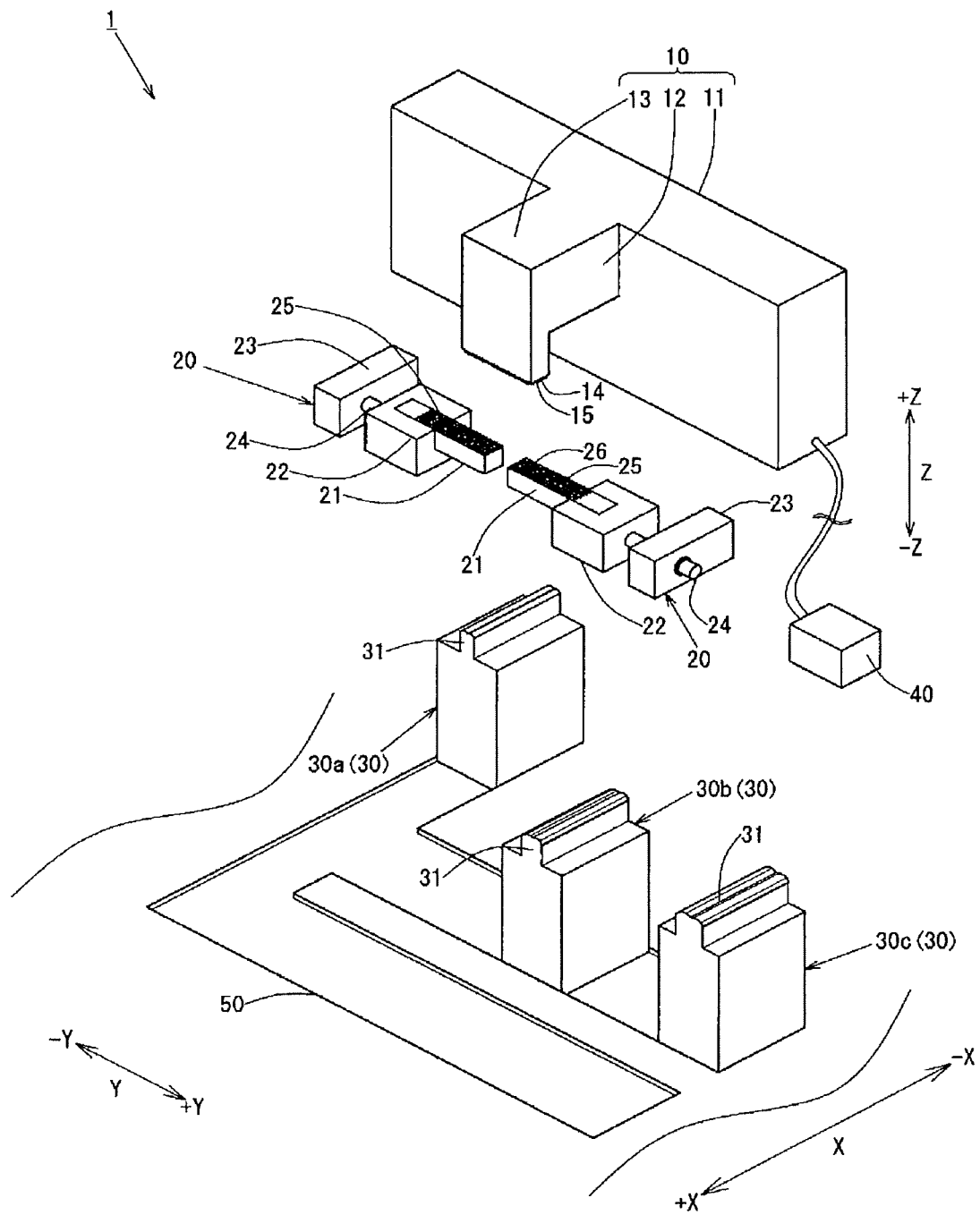
FIG. 2 is a schematic exploded perspective view of a conductor connection device.

FIG. 1 is a schematic perspective view of a conductor connection device 1, FIG. 2 is a schematic exploded perspective view of the conductor connection device 1, FIG. 3 is an explanatory diagram of a horn 13 constituting the conductor connection device 1, and FIG. 4 is an explanatory diagram of a restricting portion 21 constituting the conductor connection device 1.

Figure 3A:
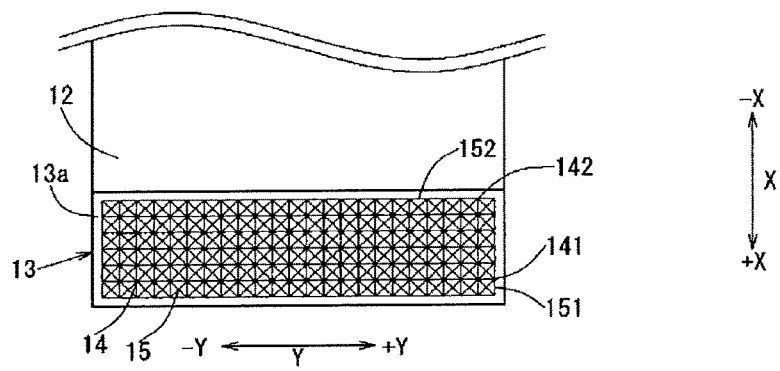
FIG. 3A is an enlarged bottom view of a bottom surface of a horn.
Figure 3B:
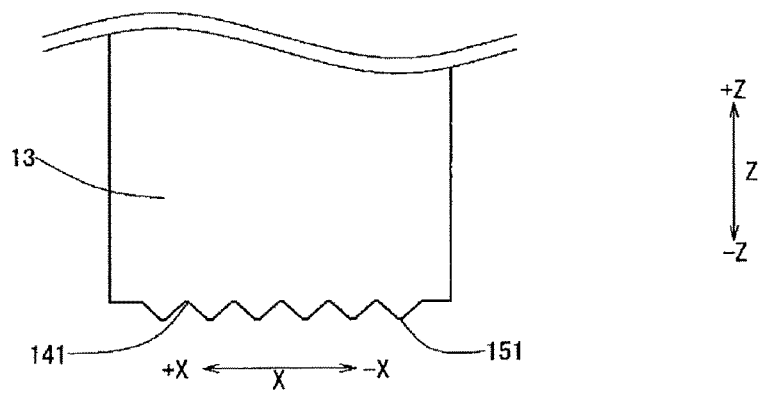
FIG. 3B is an enlarged side view of the horn in FIG. 3A as viewed from the +Y-side.
Figure 3C:
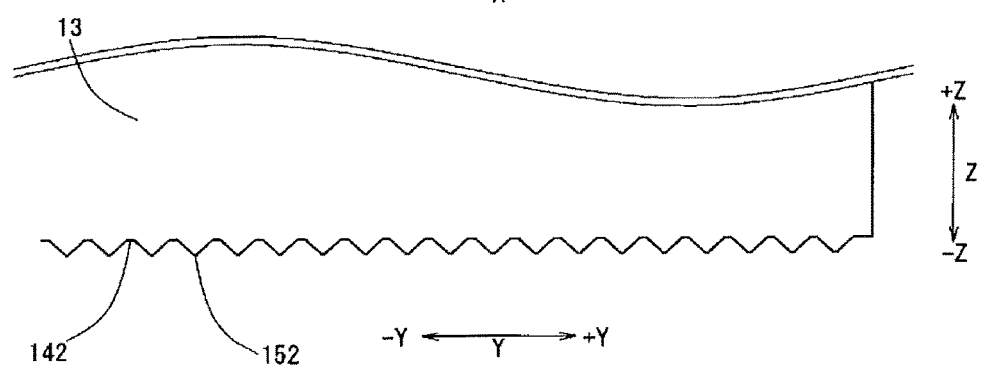
FIG. 3C is an enlarged front view of the horn in FIG. 3A as viewed from the +X-side.

Referring to FIG. 3 in detail, FIG. 3A is an enlarged bottom view of a bottom surface of the horn 13. FIG. 3B is an enlarged side view of the horn 13 as viewed from the +Y-side, and FIG. 3C is an enlarged front view of the horn 13 as viewed from the +X-side. FIGS. 3B and 3C each illustrate only a part of the horn 13 in an enlarged manner.

Figure 4A:
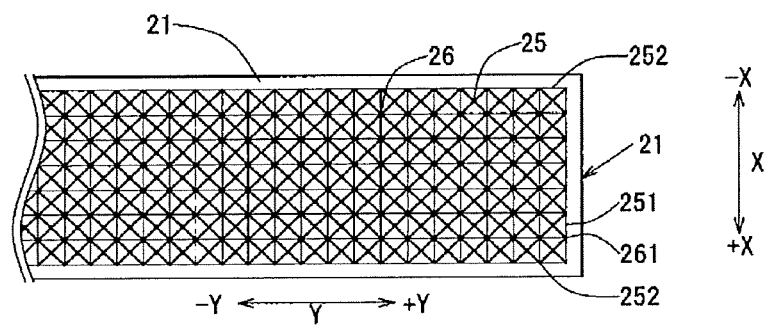
FIG. 4A is an enlarged plan view of an upper surface of a restricting portion.
Figure 4B:
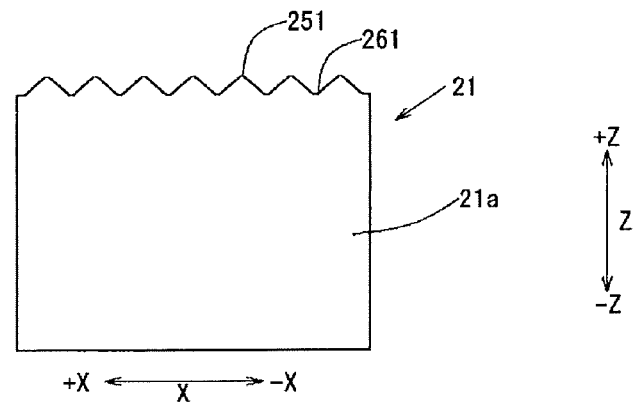
FIG. 4B is an enlarged side view of the restricting portion of FIG. 4A as viewed from the +Y-side.
Figure 4C:
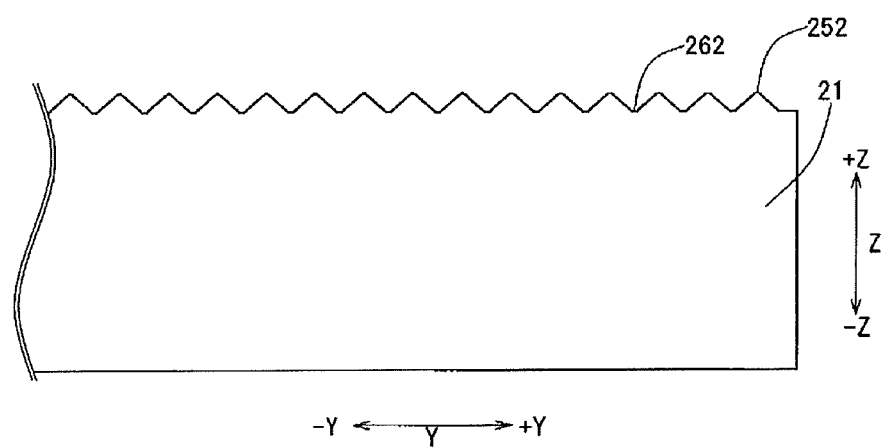
FIG. 4C is an enlarged front view of the restricting portion of FIG. 4A as viewed from the +X-side.

Referring to FIG. 3 in detail, FIG. 4A is an enlarged plan view of an upper surface of the restricting portion 21, FIG. 4B is an enlarged side view of the restricting portion 21 as viewed from the +Y-side, and FIG. 4C is an enlarged front view of the restricting portion 21 as viewed from the +X-side. FIGS. 4B and 4C each illustrate only a part of the restricting portion 21 in an enlarged manner.

Figure 5A:
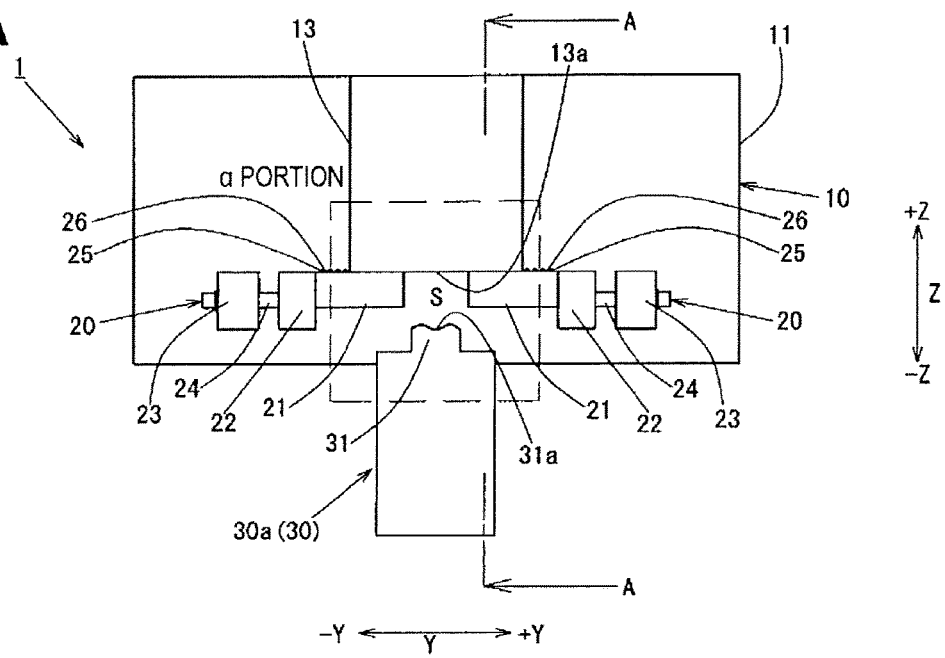
FIG. 5A is a schematic front view of a portion of the conductor connection device in which an insulated wire is connected as viewed from the +X-direction.
Figure 5B:
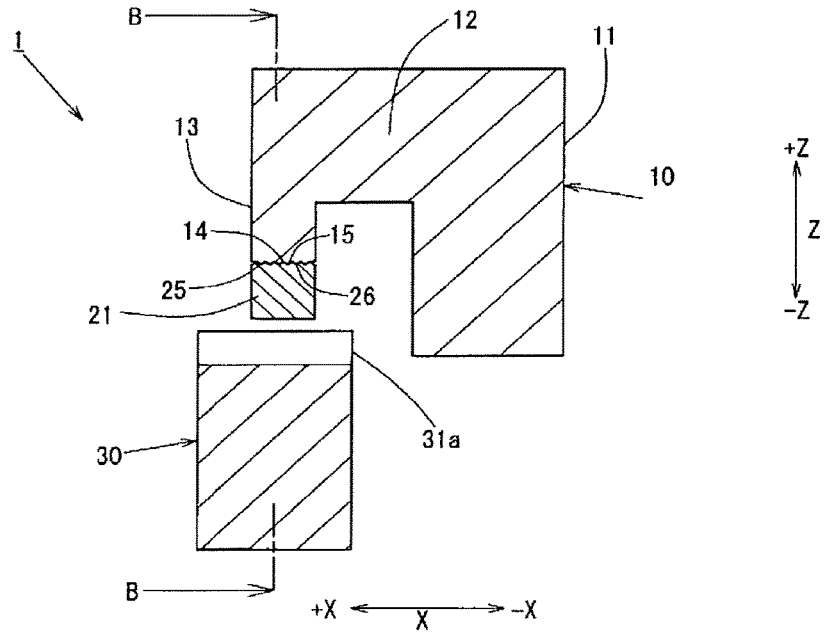
FIG. 5B is a cross-sectional view taken along line A-A in FIG. 5A.

FIG. 5 is an explanatory diagram illustrating a structure of the conductor connection device 1. Referring to FIG. 5 in detail, FIG. 5A is a schematic front view of a portion of the conductor connection device 1 in which an insulated wire 100 is connected as viewed from the +X-direction, and FIG. 5B is a cross-sectional view taken along line A-A in FIG. 5A.

Here, a longitudinal direction of the insulated wire 100 is indicated as a longitudinal direction X, a direction orthogonal to the longitudinal direction X, i.e., a lateral width direction of the insulated wire 100, is indicated as a width direction Y. In FIG. 1, a left side in the longitudinal direction X is indicated as the +X-direction, a right side is indicated as the −X-direction, a left side in the width direction Y is indicated as the −Y-direction, and a right side is indicated as the +Y-direction.

In addition, in FIG. 1, a vertical direction is indicated as an up-down direction Z, and an upper side in FIG. 1 is indicated as the +Z-direction (upward) and a lower side is indicated as the −Z-direction (downward).

As illustrated in FIG. 1, the conductor connection device 1 is configured to join a plurality of conductor exposure sections 120 provided on a leading end side of the insulated wire 100 to each other with ultrasonic welding (ultrasonic metal joining), and includes an ultrasonic welding fixture 10 that rises and lowers in the up-down direction Z, a pair of lateral adjustment units 20 fixed to the ultrasonic welding fixture 10 on the +X-direction-side thereof, a plurality of anvils 30 that compress the conductor exposure sections 120 with the ultrasonic welding fixture 10 lowering, and a control unit 40 configured to control movement of the ultrasonic welding fixture 10 and the lateral adjustment units 20.

The insulated wire 100 is composed of stranded wire conductors each covered with an insulating covering 110 made of insulating resin, the stranded wire conductors each being formed by twisting together wires made of an aluminum alloy, and the insulated wire 100 is provided with, on the leading end side thereof, the conductor exposure sections 120 in which the stranded wire conductors are each exposed by peeling the insulating covering 110 by a predetermined length.

The stranded wire conductors may be made of any material having electrical conductivity, and may be formed by twisting together wires made of aluminum, copper, copper alloy, or the like, for example. The strand conductors are not necessarily stranded wires, and may be formed by bundling wires having conductivity.

The ultrasonic welding fixture 10 constituting the conductor connection device 1 includes a lifting portion 11 that rises and lowers in the up-down direction Z using a lifting motor (not illustrated), a horn support 12 projecting from a central portion of the lifting portion 11 toward the +X direction, and the horn 13 extending downward from a +X-direction-side end surface of the horn support 12.

The lifting motor is controlled by the control unit 40.

The horn support 12 protrudes from the central portion of the lifting portion 11 toward the +X direction-side and is configured to support the horn 13 in the lifting portion 11.

As illustrated in FIGS. 1 to 5, the horn 13 extends downward from the +X-direction-side end surface of the horn support 12 and is configured to be ultrasonically vibrated in the longitudinal direction X by being connected to an ultrasonic oscillator (not illustrated).

As illustrated in FIG. 3A, the horn 13 is provided with, in the bottom surface thereof being a horn-side lower surface 13a, a plurality of horn-side recesses 14 formed recessed upward, and a plurality of horn-side protrusions 15 formed protruding downward, in a lattice pattern in the longitudinal direction X and the width direction Y. That is, the bottom surface of the horn 13 is formed to have a rugged shape as viewed from the longitudinal direction X and the width direction Y.

The horn-side recesses 14 are formed at respective intersections of horn lateral valleys 141 (refer to FIG. 3B) formed recessed upward in the width direction Y from the horn-side lower surface 13a, and horn longitudinal valleys 142 (refer to FIG. 3C) formed recessed upward in the longitudinal direction X from the horn-side lower surface 13a. The horn-side protrusions 15 are formed at respective intersections of horn lateral ridges 151 (refer to FIG. 3B) formed protruding downward in the width direction Y from the horn-side lower surface 13a across the corresponding horn lateral valleys 141, and horn longitudinal ridges 152 (refer to FIG. 3C) formed protruding downward in the longitudinal direction X from the horn-side lower surface 13a across the corresponding horn longitudinal valleys 142.

The horn lateral valleys 141 and the horn lateral ridges 151 are arrayed in five rows and six rows, respectively, at equal intervals in the width direction Y. The horn longitudinal valleys 142 and the horn longitudinal ridges 152 are arrayed in 23 rows and 24 rows, respectively, at equal intervals in the longitudinal direction X (refer to FIG. 3A). The horn-side recesses 14 and the horn-side protrusions 15 are formed in a lattice pattern in the longitudinal direction X and the width direction Y.

The lateral adjustment units 20 disposed facing each other in the width direction Y on the +X-direction-side of the ultrasonic welding fixture 10 each include a restricting portion 21 that restricts movement of the insulated wire 100 in the width direction Y, a fixing support 22 that fixes and supports the restricting portion 21, a fixing portion 23 that indirectly fixes the restricting portion 21 to the lifting portion 11, and a connecting portion 24 that movably connects the fixing support 22 to the fixing portion 23.

As illustrated in FIGS. 1 and 2, the restricting portion 21 is a rectangular parallelepiped having a length in the longitudinal direction X equal to a length of the corresponding horn 13, and a height in the up-down direction Z that is sufficiently longer than three times an outer diameter of the conductor exposure section 120.

The restricting portion 21 is provided with, in the upper surface thereof, a plurality of restricting portion-side protrusions 25 protruding upward and restricting portion-side recesses 26 for engagement with the horn-side recesses 14 and the horn-side protrusion 15.

Specifically, the restricting portion-side protrusions 25 are formed at respective intersections of restricting-portion lateral ridges 251 protruding upward in the width direction Y (refer to FIG. 4B), and restricting-portion longitudinal ridges 252 protruding upward in the longitudinal direction X (refer to FIG. 4C). The restricting portion-side recesses 26 are formed at respective intersections of restricting portion lateral valleys 261 recessed downward in the width direction Y, being formed between the corresponding restricting-portion lateral ridges 251 (refer to FIG. 4B), and restricting-portion longitudinal valleys 262 recessed downward in the longitudinal direction X, being formed between the corresponding restricting-portion longitudinal ridges 252 (refer to FIG. 4C).

The restricting-portion lateral ridges 251 and the restricting-portion lateral valleys 261 are arrayed in seven rows and six rows, respectively, at equal intervals in the width direction Y so as to match with the corresponding horn lateral valleys 141 and horn lateral ridges 151, respectively, and the restricting-portion longitudinal ridge portions 252 and the restricting-portion longitudinal valleys 262 are arrayed in a respective plurality of rows at equal intervals in the longitudinal direction X. That is, the restricting portion-side protrusions 25 and the restricting portion-side recesses 26 are formed in a lattice pattern in the longitudinal direction X and the width direction Y, and the upper surface of the restricting portion 21 has a rugged shape matching with the horn-side lower surface 13a as viewed from the longitudinal direction X and the width direction Y.

The restricting portion 21 configured as described above is fixed at one end to fixing support 22 while the one end is fitted into the fixing support 22, and is supported in the width direction Y.

While in the present embodiment, the restricting portion 21 has a height that is sufficiently long compared to three times the outer diameter of the conductor exposure section 120, it is not necessary for the height to be three times the outer diameter of the conductor exposure section 120, and thus the restricting portion 21 may be formed having a height that is sufficiently longer than a total outer diameter of a bundle of wires formed by the plurality of conductor exposure sections 120 that are to be subjected to ultrasonic welding.

As illustrated in FIGS. 1 and 2, the connecting portion 24 is a rod-like body that passes through the fixing portion 23 fixed to the lifting portion 11 in the width direction Y, and is fixed at one end to the fixing support 22, and is configured to be movable in the width direction Y using a lateral movement motor (not illustrated) that is controlled by the control unit 40.

That is, the connecting portion 24 connects the fixing support 22 and the fixing portion 23, and allows the fixing support 22 fixed with the restricting portion 21 to be moved with respect to the fixing portion 23. The fixing portion 23 is fixed to the lifting portion 11, so that the restricting portion 21 and the fixing support 22 are indirectly fixed to the lifting portion 11.

The control unit 40 for controlling the lifting motor and the lateral movement motor, which are not illustrated, is configured to enable not driving the lifting motor and the lateral movement motor in synchronization with each other, and can lower the ultrasonic welding fixture 10 while moving it in the width direction Y of the restricting portion 21.

The restricting portions 21 can be moved independently in the width direction Y.

The anvil 30 is a receiving fixture having the shape of a rectangular parallelepiped provided on a base plate of the conductor connection device 1, and is provided with, in the upper surface thereof, an anvil upper portion 31 erected upward in +Z direction. The anvil upper portion 31 is formed having a predetermined width corresponding to a total outer diameter of a bundle of wires formed by the plurality of conductor exposure sections 120 that are to be subjected to ultrasonic welding, and a height being more than that of the restricting portion 21. The anvil upper portion 31 is provided with, in the upper surface thereof being an anvil-side upper surface 31a, two protrusions formed in the longitudinal direction X, forming a gently continuous rugged shape (refer to FIG. 5A).

The rugged shape formed in the anvil-side upper surface 31a will be described in detail. The rugged shape is formed such that the plurality of conductor exposure sections 120 aligned parallel to the width direction Y and the up-down direction Z is brought into contact with a recess and the protrusion to allow contact surfaces of the conductor exposure sections 120 in contact with each other to be disposed intersecting the width direction Y and the up-down direction Z.

For example, the rugged shape formed in the anvil-side upper surface 31a is formed having a length between apexes of the protrusions (a width of the recess) and a length between bottoms of the recesses that are each more than an outer diameter of the conductor exposure section 120, and a height of each of the protrusion and the recess that is less than the outer diameter of the conductor exposure section 120.

In the present embodiment, three anvils 30 configured to be different in width of the anvil upper portion 31 in the width direction Y are provided (anvils 30a, 30b, and 30c). The anvils 30 are formed such that the anvil 30a has a smallest width and the anvil 30c has a greatest width, in the width direction Y.

The plurality of the anvils 30 (anvils 30a, 30b, and 30c) provided as described above is configured to be movable along rails 50, so that the desired anvil 30 can be positioned below the ultrasonic welding fixture 10.

While the three anvils 30 are provided in the present embodiment, the number of the anvils 30 can be appropriately adjusted suitable for the insulated wire 100 to be connected, and a width of the anvil upper portion 31 of each of the anvils 30 also can be appropriately adjusted.

As illustrated in FIGS. 1 and 5, the ultrasonic welding fixture 10 and the lateral adjustment unit 20 formed as described above are configured such that the restricting portion-side protrusions 25 and the restricting portion-side recesses 26 are fitted into the horn-side recesses 14 and the horn-side protrusions 15, respectively, and the upper surface of the restricting portion 21 and the horn-side lower surface 13a being the upper surface of the horn 13 are flush with each other to allow the restricting portion 21 to be disposed being movable in the width direction Y along the horn-side lower surface 13a.

In addition, the anvil 30 is disposed at a position where the horn-side lower surface 13a and the anvil-side upper surface 31a face each other. At this time, the anvil 30 is disposed such that a −X-direction-side end portion of the anvil upper portion 31 does not face the horn 13 and the lifting portion 11 (refer to FIG. 5B).

The anvil 30 is disposed below the horn 13 by being moved along the rails 50.

The conductor connection device 1 described above is configured such that the ultrasonic welding fixture 10 and the lateral adjustment unit 20 are fixed, and the anvil 30 is disposed below the ultrasonic welding fixture 10, and enables not only the ultrasonic welding fixture 10 and the lateral adjustment unit 20 to be moved downward with the lifting motor, but also the restricting portion 21 to be moved in the width direction Y with the lateral movement motor, by control of the control unit 40.

In addition, while the lateral adjustment unit 20 is fixed to the ultrasonic welding fixture 10, leading end surfaces 21a of the respective restricting portions 21 facing each other are disposed separated at a predetermined interval to enable the pair of restricting portions 21 and the horn 13 to form a placement space S into which a plurality of the insulated wires 100 (conductor exposure sections 120) can be inserted and disposed (refer to FIG. 5A).

Hereinafter, a connection method of the insulated wire 100 using the conductor connection device 1 will be described briefly with reference to FIGS. 6 to 8.

Figure 6:
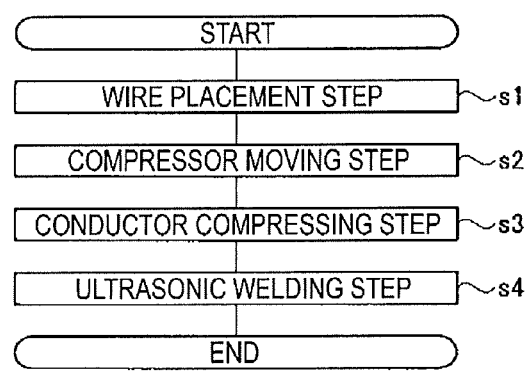
FIG. 6 is a flowchart of a conductor connection method.

FIG. 6 illustrates a flowchart of the conductor connection method for welding and connecting conductor exposure sections 120 of a plurality of insulated wires 100, and FIGS. 7 and 8 are each an explanatory diagram illustrating the conductor connection method for connecting the conductor exposure sections 120 using a cross-sectional view taken along line B-B in a-portion in FIG. 5.

Figure 7A:
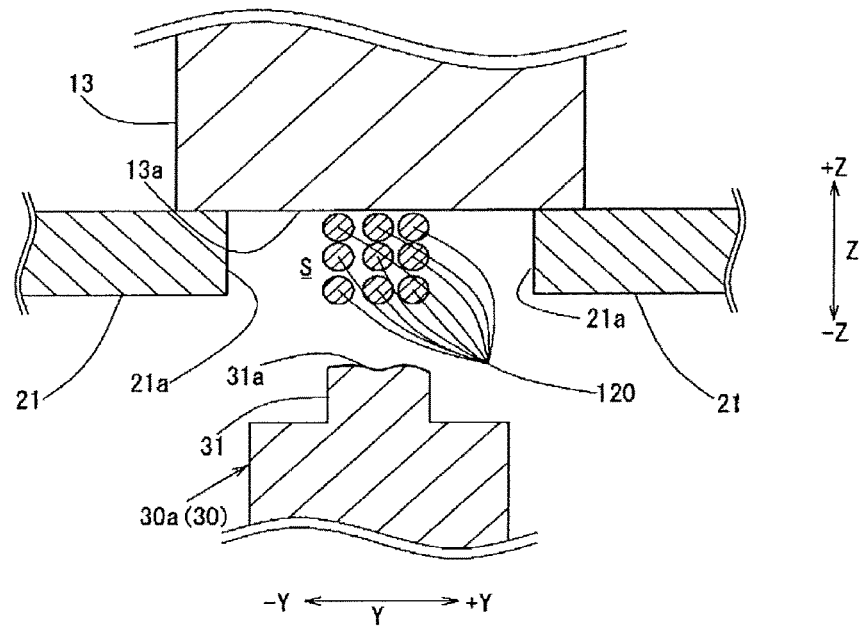
FIG. 7A is a cross-sectional view taken along line B-B in FIG. 5B in a state where the conductor exposing portions are inserted into the placement space.
Figure 7B:
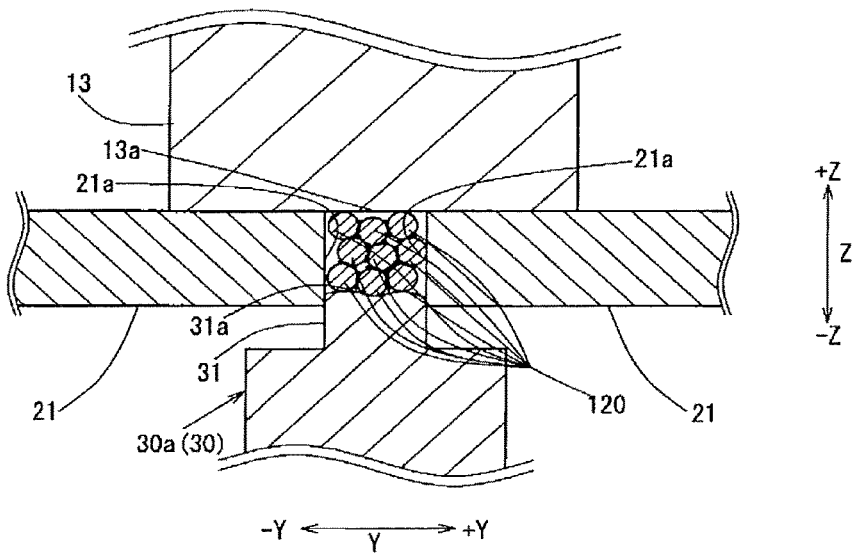
FIG. 7B is a cross-sectional view taken along line B-B in FIG. 5B in a state where the ultrasonic welding fixture and the lateral adjustment unit are lowered while the conductor exposure sections are inserted into the placement space.

In detail, FIG. 7A is a cross-sectional view taken along line B-B in a state where the conductor exposing portions 120 are inserted into the placement space S, and FIG. 7B is a cross-sectional view taken along line B-B in a state where the ultrasonic welding fixture 10 and the lateral adjustment unit 20 are lowered while the conductor exposure sections 120 are inserted into the placement space S.

Figure 8A:
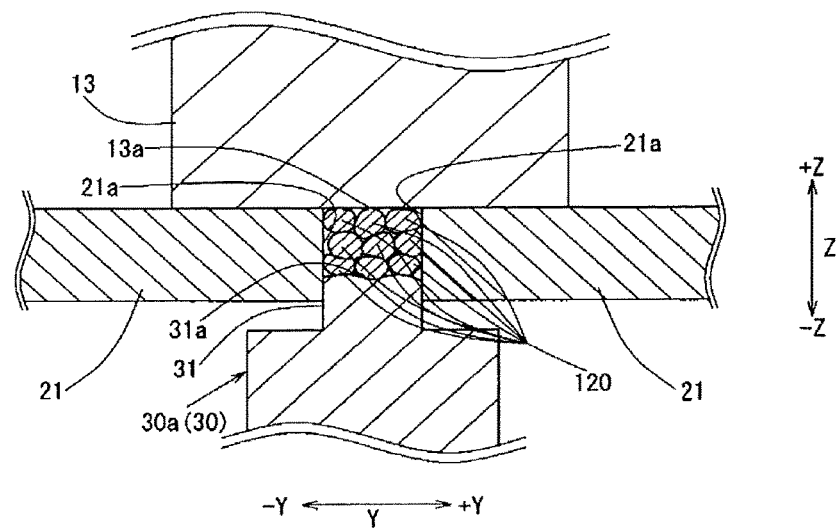
FIG. 8A is a cross-sectional view taken along line B-B in FIG. 5B in a state where the conductor exposure sections inserted into the placement space are compressed by the horn and the anvil.
Figure 8B:
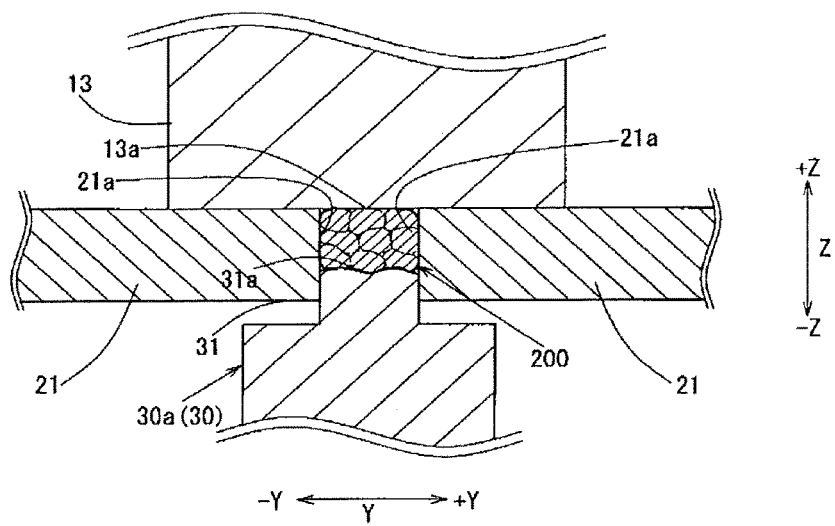
FIG. 8B is a cross-sectional view taken along line B-B in FIG. 5B in a state where the conductor exposure sections are subjected to ultrasonic welding.

FIG. 8A is a cross-sectional view taken along line B-B in a state where the conductor exposure sections 120 inserted into the placement space S are compressed by the horn 13 and the anvil 30, and FIG. 8B is a cross-sectional view taken along line B-B in a state where the conductor exposure sections 120 are subjected to ultrasonic welding.

In FIGS. 7 and 8, the restricting portion-side protrusion portions 25 and the restricting portion-side recesses 26 are eliminated.

As illustrated in FIG. 6, the conductor exposure section 120 provided at a terminal portion of the insulated wire 100 is electrically connected by performing the following steps in order below: a wire placement step S1 of disposing the conductor exposure section 120 in the placement space S; a compression movement step S2 of lowering the ultrasonic welding fixture 10 and the lateral adjustment unit 20; a conductor compressing step S3 of compressing the conductor exposure section 120 with the horn 13 and the anvil 30; and an ultrasonic welding step S4 of ultrasonically welding the compressed conductor exposure section 120.

Each of the steps will be described in detail below with reference to FIGS. 7 and 8.

Preliminarily, a plurality (nine in the present embodiment) of the insulated wires 100 are prepared, and the insulating covering 110 on each of the insulated wires 100 on one end side (−X-direction-side) thereof is cut off by a predetermined length to expose a stranded conductor surrounded by the insulating covering 110, thereby forming the conductor exposure section 120.

Next, an anvil 30 suitable for the number and outer diameter of the conductor exposure sections 120 to be connected is selected, and the anvil 30 selected is disposed at a predetermined position by being moved along the rails 50 to allow the anvil-side upper surface 31a to be disposed facing the horn-side lower surface 13a. Here, the anvil 30a is positioned below the ultrasonic welding fixture 10.

Subsequently, while the pair of restricting portions 21 are moved in the width direction Y until the leading end surfaces 21a have a predetermined interval, the ultrasonic welding fixture 10 is raised until the horn 13 reaches a predetermined height to form the placement space S.

In this state, as illustrated in FIG. 7A, nine conductor exposure sections 120 are arrayed three in the up-down direction Z and three in the width direction Y in the placement space S formed by the pair of restricting portions 21 disposed facing each other at a predetermined interval and the horn 13, and are inserted from the +X-direction-side toward the −X-direction-side (wire placement step S1).

Then, as illustrated in FIG. 7B, while the ultrasonic welding fixture 10 is lowered, the pair of restricting portions 21 are moved toward the conductor exposure sections 120 in the width direction Y in synchronization with lowering of the ultrasonic welding fixture 10, by control of the control unit 40. Accordingly, the leading end surfaces 21a are brought into contact with respective side surfaces of the anvil upper portion 31 in the width direction Y. Then, the conductor exposure sections 120 are sandwiched between the horn-side lower surface 13a and the anvil-side upper surface 31a, and the conductor exposure sections 120 are pressed from above by the horn 13 (compression movement step S2).

Here, as illustrated in FIG. 5B, the restricting portion 21 can be moved along the horn-side lower surface 13a while the horn-side recesses 14 and the horn-side protrusions 15 engage with the restricting portion-side protrusions 25 and the restricting portion-side recesses 26, respectively, so that there is no gap between the horn 13 and the restricting portion 21. Thus, when the pair of restricting portions 21 are moved in the width direction Y, the conductor exposure sections 120 can be prevented from being caught by the horn 13 and the pair of restricting portions 21.

In addition, the horn lateral valley 141 and the restricting portion lateral ridge 251 are formed in the width direction Y orthogonal to the longitudinal direction X in which the conductor exposure sections 120 extend, and the horn longitudinal valley 142 and the restricting portion longitudinal ridge 252 are formed in the longitudinal direction X. Then, the horn-side recess 14 and the horn-side protrusion 15 engage with the restricting portion-side protrusion 25 and the restricting portion-side recess 26, respectively. Thus, a gap in the longitudinal direction X is less likely to be formed between the horn 13 and the pair of restricting portions 21, so that the conductor exposure sections 120 are more prevented from being caught between the horn 13 and the pair of restricting portions 21.

Additionally, the leading end surfaces 21a are brought into contact with respective side surfaces of the anvil upper portion 31 in the width direction Y before being brought into contact with the conductor exposure sections 120 pressed by the horn 13, so that there is no gap between the pair of restricting portions 21 and the anvil upper portion 31. Accordingly, even when the conductor exposure sections 120 are pressed from above and moved in the width direction Y, movement in the width direction Y of the conductor exposure sections 120 pressed from above can be restricted, and the conductor exposure sections 120 can be prevented from being caught between the pair of restricting portions 21 and the anvil upper portion 31.

In addition, the anvil-side upper surface 31a configured to support the conductor exposure sections 120 pressed from above is formed having the rugged shape, so that the three conductor exposure sections 120 arrayed on a lower side are disposed shifted in the up-down direction Z and the width direction Y along the rugged shape. Thus, a contact surface between the conductor exposure sections 120 is disposed in a direction intersecting the up-down direction Z and the width direction Y (refer to FIG. 7B).

Accordingly, the three conductor exposure sections 120 disposed in the center are each disposed between the conductor exposure sections 120 displaced from each other in the width direction Y and the up-down direction Z, so that contact surfaces between the corresponding three conductor exposure sections 120 are also disposed in a direction intersecting the width direction Y and the up-down direction Z. Similarly, the contact surfaces between the corresponding three conductor exposure sections 120 disposed in an upper side are also disposed along a direction intersecting the width direction Y and the up-down direction Z.

As described above, the nine conductor exposure sections 120 are disposed cluttered inside the placement space S, so that the contact surfaces between the corresponding conductor exposure sections 120 are likely to be formed at respective positions displaced from a perpendicular to the longitudinal direction X being a direction of ultrasonic vibration. Thus, the ultrasonic vibration enables the conductor exposure sections 120 to be more reliably joined to each other, so that connection failure can be prevented (refer to FIG. 7B).

Then, further lowering the horn 13 while the conductor exposure sections 120 are disposed cluttered in the placement space S enables the conductor exposure sections 120 to be compressed from the up-down direction Z (conductor compressing step S3), and thus not only a contact place between the corresponding conductor exposure sections 120 but also a contact area therebetween can be increased (refer to FIG. 8A).

Subsequently, when the ultrasonic welding fixture 10 (horn 13) is further lowered while the conductor exposure sections 120 are compressed by the horn 13 that is ultrasonically vibrated in the longitudinal direction X, the conductor exposure sections 120 are joined to each other to form ultrasonic metal joining with ultrasonic welding (ultrasonic welding step S4).

As described above, when the ultrasonic metal joining is formed while the conductor exposure sections 120 are compressed, the contact surfaces between the corresponding plurality of conductor exposure sections 120 are welded to each other as illustrated in FIG. 8B, and then a wire harness 200 formed by bundling the insulated wires 100 can be manufactured.

Thus, joining failure between the conductor exposure sections 120 can be prevented, so that the conductor exposure sections 120 can be more reliably electrically connected.

The wire harness 200 in which the insulated wires 100 are bundled and welded as described above is formed with the anvil 30 side thereof having a rugged shape in a welded cross section of the welded conductor exposure sections 120.

When the conductor exposure sections 120 are compressed with the horn 13 and the anvil 30, the conductor exposure sections 120 can be more reliably brought into contact with each other. Thus, when the conductor exposure sections 120 are welded, a cavity can be prevented from being formed between the conductor exposure sections 120.

While in the present embodiment, the horn 13 is ultrasonically vibrated after being lowered to compress the conductor exposure sections 120, the conductor exposure sections 120 may be compressed while the horn 13 is ultrasonically vibrated.

The conductor connection device 1 configured as described above applies ultrasonic welding to a plurality of conductor exposure sections 120 to perform ultrasonic metal joining, and includes the horn 13 including the horn-side lower surface 13a that compresses the conductor exposure sections 120, the horn 13 being configured to be ultrasonically vibrated, the pair of restricting portions 21 that is configured to be brought into contact with the horn-side lower surface 13a and to be relatively movable along the horn-side lower surface 13a, and the anvil 30 that is relatively moved toward and away from the horn-side lower surface 13a. Then, the horn 13 and the pair of restricting portions 21 are lowered relative to the anvil 30 to sandwich the anvil upper portion 31 constituting the anvil 30 between the pair of restricting portions 21 facing each other in the pair of restricting portions 21, and the pair of restricting portions 21 is moved toward the conductor exposure sections 120. Thus, joining of various conductor exposure sections 120 can be easily handled.

In detail, the pair of restricting portions 21 are configured to be movable along the horn-side lower surface 13a of the horn 13. Thus, even when the conductor exposure sections 120 are changed in outer diameter or number, adjusting the positions of the pair of restricting portions 21 enables the conductor exposure sections 120 changed in outer diameter or number to be disposed in the placement space S formed by the horn-side lower surface 13a and the pair of restricting portions 21.

Accordingly, various conductor exposure sections 120 can be joined only by replacing the anvil 30 with that suitable for the conductor exposure sections 120 to be joined. Thus, taking time for changing set-up for welding the conductor exposure sections 120 with ultrasonic welding can be prevented, enabling the conductor exposure sections 120 to be easily joined.

Specifically, even when a wire bundle composed of a plurality of exposed conductor portions 120 is different in an outer diameter from a wire bundle manufactured previously by joining conductor exposure sections 120, from a wire bundle due to difference in number of conductor exposure sections 120 to be joined, or the like, the placement space S suitable for inserting the conductor exposure sections 120 can be formed by moving the pair of restricting portions 21 along the horn-side lower surface 13a, and thus the conductor exposure sections 120 can be easily joined to each other.

In addition, the pair of restricting portions 21 are configured to be movable along the horn-side lower surface 13a of the horn 13, so that no gap is formed between the pair of restricting portions 21 and the horn 13 due to ultrasonic vibration of the horn 13. Thus, even when the horn 13 is moved relative to the anvil 30 to compress the conductor exposure sections 120 and the horn 13 is ultrasonically vibrated, the conductor exposure sections 120 can be prevented from being caught in a gap formed between the horn 13 and the pair of restricting portions 21 and from forming burrs.

Further, the pair of restricting portions 21 are configured to be movable relative to the horn 13 along the horn-side lower surface 13a, so that the horn-side lower surface 13a that is brought into contact with the conductor exposure sections 120 can be changed in position by appropriately moving the position of the pair of restricting portions 21 along the horn-side lower surface 13a. That is, a position of wear of the horn-side lower surface 13a due to ultrasonic vibration of the horn 13 can be changed, so that localized wear of the horn 13 can be prevented to enable life of the conductor connection device 1 to be extended.

The horn 13 can effectively join the conductor exposure sections 120 by being ultrasonically vibrated in a direction intersecting the width direction Y in which the pair of restricting portions 21 faces each other and the up-down direction Z in which the horn 13 and the anvil 30 face each other.

In detail, exposed conductors 130 disposed in the placement space S are compressed by compressing the conductor exposure sections 120 with the horn 13 and the anvil 30 from the up-down direction Z, so that an external force toward the up-down direction Z acts on contact surfaces between the corresponding conductor exposure sections 120 aligned in the up-down direction Z being the compression direction. In addition, while the horn 13 and the anvil 30 compress the conductor exposure sections 120 to cause the conductor exposure sections 120 to tend to extend in the width direction Y, movement of the conductor exposure sections 120 in the width direction Y is restricted by the pair of restricting portions 21. Thus, an external force toward the width direction Y acts on the contact surfaces between the corresponding conductor exposure sections 120 aligned in the width direction Y.

In this state, when the horn 13 is ultrasonically vibrated in a direction orthogonal to the up-down direction Z and the width direction Y (longitudinal direction X), i.e., the conductor exposure sections 120 are ultrasonically vibrated in the up-down direction Z in which an external force acts on the conductor exposure sections 120 and the longitudinal direction X orthogonal to the width direction Y, an oxide film or the like on a metal surface of each of the conductor exposure sections 120 is removed by ultrasonic vibration, and then the conductor exposure sections 120 are welded due to interatomic attraction of metal constituting each of the conductor exposure sections 120. Accordingly, the conductor exposure sections 120 aligned in the up-down direction Z or the width direction Y can be efficiently and reliably joined.

In addition, there is provided the control unit 40 that synchronizes movement of the horn 13 and the pair of restricting portions 21 relative to the anvil 30 and movement of at least one of the pair of restricting portions 21 relative to the other, so that the anvil 30 and the pair of restricting portions 21 can be brought into contact with each other before the anvil 30 and the horn 13 compress the conductor exposure sections 120. Thus, the conductor exposure sections 120 can be reliably prevented from being caught in a gap formed between the anvil 30 and the pair of restricting portions 21.

The horn 13 and the pair of restricting portions 21 are moved toward the anvil 30, so that a complex structure for moving not only the horn 13 and the restricting portion 21, but also the anvil 30 is not necessary. In addition, a drive assembly can be provided only for the horn 13, so that the conductor exposure sections 120 can be reliably connected to each other with a simple structure.

The anvil-side upper surface 31a of the anvil 30, facing the horn-side lower surface 13a, is formed in a rugged shape, so that the conductor exposure sections 120 in contact with the anvil-side upper surface 31a are disposed along the rugged shape. Thus, a contact surface on which the corresponding conductor exposure sections 120 are brought into contact with each other intersects the up-down direction Z or the width direction Y.

Accordingly, when the horn 13 is ultrasonically vibrated, an oxide film on the contact surface is more easily removed because the contact surface between the corresponding conductor exposure sections 120 and a vibration direction are not perpendicular to each other. Thus, ultrasonic welding can be performed efficiently, so that the conductor exposure sections 120 can be reliably joined to each other to form ultrasonic metal joining.

In addition, the rugged shape of the anvil-side upper surface 31a is formed along the width direction Y intersecting the longitudinal direction X being a vibration direction of the ultrasonic vibration of the horn 13, so that contact surfaces of the corresponding conductor exposure sections 120 and the vibration direction can be more reliably intersected. Thus, an oxide film can be more efficiently removed on each of the contact surfaces of the corresponding conductor exposure sections 120 due to the ultrasonic vibration of the horn 13. Accordingly, the conductor exposure sections 120 can be more reliably joined to each other.

The plurality of anvils 30 is provided in accordance with the conductor exposure sections 120 configured to be replaceable, so that the anvil 30 can be more easily replaced with the desired anvil 30. Thus, taking time for ultrasonic welding of the conductor exposure sections 120 can be more reliably prevented to enable improving versatility.

While correspondence between the configuration of the invention and the above-described embodiments is as follows: the conductor corresponds to the conductor exposure section 120; the conductor connection device corresponds to the conductor connection device 1; the contact surface corresponds to the horn-side lower surface 13a; the opposing contact surface corresponds to the anvil-side upper surface 31a; the step of disposing a conductor corresponds to the wire placement step S1; the step of moving and compressing corresponds to the compression movement step S2 and the conductor compressing step S3; and the step of welding corresponds to the ultrasonic welding step S4, the invention is not limited to the configuration of the embodiments described above, and many embodiments can be obtained.

For example, while in the present embodiment, the horn 13 is configured to be ultrasonically vibrated in the longitudinal direction X, the horn 13 may also be configured to be ultrasonically vibrated in the width direction Y. However, in the present embodiment in which the ultrasonic vibration is in the longitudinal direction X, the direction of ultrasonic vibration and the direction of the rugged shape formed on the anvil-side upper surface 31a (the width direction Y) are orthogonal to each other, so that ultrasonic welding can be performed efficiently.

It is not necessary to be vibrated in the longitudinal direction X or the width direction Y, and ultrasonic vibration may be performed in a direction intersecting the longitudinal direction X.

While in the present embodiment, the rugged shape formed in the anvil-side upper surface 31a is formed having a length between apexes of the protrusions (a width of the recess) and a length between bottoms of the recesses that are each more than an outer diameter of the conductor exposure section 120, and a height of each of the protrusion and the recess that is less than the outer diameter of the conductor exposure section 120, the rugged shape is not necessarily formed as described above as long as the conductor exposure sections 120 are disposed having contact surfaces of the corresponding conductor exposure sections 120 intersecting the width direction Y and the up-down direction Z. That is, the rugged shape formed in the anvil-side upper surface 31a may be formed having a width of the recesses and a width of the protrusions are each less than an outer diameter of the conductor exposure section 120.

While in the present embodiment, the rugged shape is formed in the anvil-side upper surface 31a in the width direction Y, the rugged shape may be formed in the longitudinal direction X, and the shape of the rugged shape is not limited to a gradually continuous rugged shape as in the present embodiment, and may be a stepped shape or the like.

While in the present embodiment, only the anvil-side upper surface 31a is formed in the rugged shape in the width direction Y, a portion in the leading end surface 21a that is brought into contact with the conductor exposure sections 120, i.e., a portion in the leading end surface 21a that is not brought into contact with the anvil upper portion 31, may be formed in a rugged shape, for example. In addition, a rugged shape may be provided in only a central portion of the horn-side lower surface 13a.

The leading end surface 21a close to the horn 13 is formed in the rugged shape as described above, so that a contact area and a contact portion between the corresponding conductor exposure sections 120 can be increased by not only restricting movement of the conductor exposure sections 120 in the width direction Y but also disposing the conductor exposure sections 120 in a cluttered manner, and thus joining failure can be more reliably prevented.

In this case, the horn 13 side and the leading end surface 21a side in the welded cross section of the wire harness 200 are formed having a rugged shape.

While in the present embodiment, the restricting portion-side protrusions 25 of the restricting portion 21 engage with the horn-side recesses 14 provided in the horn-side lower surface 13a being the bottom surface of the horn 13, and the restricting portion 21 is configured to be movable in the width direction Y along the horn lateral valleys 141, this configuration is not necessarily required as long as the restricting portion 21 can be moved in the width direction Y along the horn-side lower surface 13a.

For example, while in the present embodiment, not only the horn-side recesses 14 and the horn-side protrusions 15, but also the restricting portion-side protrusions 25 and the restricting portion-side recesses 26, are formed in a lattice pattern in the longitudinal direction X and the width direction Y, the number of lattices may be changed as appropriate. In addition, the horn-side lower surface 13a may be formed with only the horn-side recesses 14 or the horn-side protrusions 15, and the corresponding restricting portion 21 may be formed with, in the upper surface thereof, the restricting portion-side protrusions 25 or the restricting portion-side recesses 26.

In addition, opposing surfaces of the horn 13 and the restricting portion 21 may have any structure as long as the restricting portion 21 can be moved in the width direction Y along the horn-side lower surface 13a.

The restricting portion-side protrusions 25 and the restricting portion-side recesses 26 may also be formed only on an upper surface of one of the pair of restricting portions 21. In this case, the horn-side recesses 14 and the horn-side protrusions 15 may also be provided in the horn-side lower surface 13a corresponding to the restricting portion-side protrusions 25 and the restricting portion-side recesses 26. In addition, both of the pair of restricting portions 21 in not necessarily moved in the width direction Y along the horn-side lower surface 13a, and one of the pair of restricting portions 21 may be moved approaching the other.

One of the horn 13 and the restricting portion 21 may be formed with recesses or protrusions in a lattice pattern, and the other may be formed with ridges or valleys in the width direction Y, corresponding to the recesses or the protrusions in a lattice pattern.

In addition, a shape without the horn longitudinal valleys 142 and/or the restricting-portion longitudinal ridges 252 formed in the longitudinal direction X may be used, for example. That is, the horn-side recesses 14 and/or the restricting portion-side protrusions 25 may be composed of the horn lateral valleys 141 and the restricting portion lateral ridges 251 that are each formed in an elongated shape in the width direction Y. In this case, while only one horn-side recess 14 and one restricting portion-side protrusion 25 may be provided, a plurality of them may be preferably provided in view of preventing insulated wires from being caught.

That is, the horn-side lower surface 13a of the horn 13 is provided with horn-side recesses 14 each being recessed upward at least in the width direction Y, or with horn-side projections 15 each protruding downward in the width direction Y. At least one of the pair of restricting portions 21 is provided with, in the upper surface thereof, at least the restricting portion-side protrusions 25 protruding upward corresponding to the horn-side recesses 14 or with the restricting portion-side recesses 26 recessed downward corresponding to the horn-side protrusions 15, being formed corresponding to the horn-side recesses 14 or the horn-side protrusions 15. Then, the restricting portion-side protrusions 25 or the restricting portion-side recesses 26 are fitted along the corresponding horn-side recesses 14 or horn-side protrusions 15 to allow the pair of restricting portions 21 to be movable relative to the horn 13, so that the pair of restricting portions 21 can be moved in the width direction Y along the horn-side lower surface 13*a*.

When the pair of restricting portions 21 are configured to be moved along the horn-side lower surface 13*a* as described above, a gap is prevented from being generated between the horn 13 and the pair of restricting portions 21, and thus the conductor exposure sections 120 can be prevented from being caught.

While the conductor connection device 1 is configured to allow the conductor exposure sections 120 to be inserted into the placement space S from one direction (+X-direction) and welded, the conductor connection device 1 may be configured to allow conductor exposure sections 120 to be inserted from both directions to weld the conductor exposure sections 120, or may be configured to weld a conductor exposure section 120 exposed by stripping off a wire covering from an intermediate portion of a wire rather than an end portion thereof to a conductor exposure section of another wire, for example. That is, the conductor connection device 1 is not limited to a device for connecting a terminal of the insulated wire 100.

REFERENCE SIGNS LIST

1 Conductor connection device
13 Horn
13*a* Horn-side lower surface
21 Restricting portion
30 Anvil
31*a* Anvil-side upper surface
40 Control unit
120 Conductor exposure section
s1 Wire placement step
s2 Compression movement step
s3 Conductor compressing step
s4 Ultrasonic welding step

The invention claimed is:

1. A conductor connection device for joining a plurality of conductors with ultrasonic welding, the conductor connection device comprising:
a horn including a first contact surface that is brought into contact with the conductors, the horn being configured to be ultrasonically vibrated;
a pair of restricting portions each having a second contact surface configured to be brought into contact with the first contact surface and to be relatively movable along the first contact surface, wherein the first and second contact surfaces each have engagement features having complementary shapes that are configured to maintain contact engagement between the first and second contact surfaces during relative movement of the second contacts surfaces along the first contact surface; and
an anvil that is relatively moved toward and away from the contact surface,
the horn and the pair of restricting portions being moved relative to the anvil to sandwich the anvil between the pair of restricting portions facing each other, and at least one of the pair of restricting portions being moved toward the other.

2. The conductor connection device according to claim 1, wherein
the horn is ultrasonically vibrated in a direction intersecting a direction in which the pair of restricting portions faces each other and a direction in which the horn and the anvil face each other.

3. The conductor connection device according to claim 1, further comprising:
a control unit that synchronizes movement of the horn and the pair of restricting portions relative to the anvil and movement of at least one of the pair of restricting portions relative to the other.

4. The conductor connection device according to claim 1, wherein
the horn and the pair of restricting portions are moved toward the anvil.

5. The conductor connection device according to claim 1, wherein
the anvil is formed with an opposing contact surface facing the first contact surface, the opposing contact surface having contoured shape.

6. The conductor connection device according to claim 5, wherein
the contoured shape of the opposing contact surface is formed in a direction intersecting a vibration direction of ultrasonic vibration of the horn.

7. The conductor connection device according to claim 1, wherein said anvil comprising:
a plurality of the anvils each configured to be positioned in accordance with the conductors to be connected.

8. A conductor connection method comprising the steps of:
disposing a plurality of conductors in a space formed by a horn including a first contact surface that is brought into contact with the conductors, the horn being configured to be ultrasonically vibrated, and a pair of restricting portions each having a second contact surface that is brought into contact with the first contact surface and is disposed facing each other at a predetermined interval, the pair of restricting portions being relatively moved along the first contact surface, wherein the first and second contact surfaces each have engagement features having complementary shapes that are configured to maintain contact engagement between the first and second contact surfaces during relative movement of the second contacts surfaces along the first contact surface;
moving the horn and the pair of restricting portions relative to an anvil disposed at a predetermined interval with respect to the first contact surface while moving at least one of the pair of restricting portions relatively toward the other of the pair of restricting portions, and while maintaining contact engagement between the first and second contact surfaces, to sandwich the anvil between the pair of restricting portions facing each other, and compressing the conductors with the anvil and the horn with the pair of restricting portions sandwiching the anvil; and
welding the conductors compressed by the anvil and the horn with ultrasonic welding by ultrasonically vibrating the horn.

\* \* \* \* \*